United States Patent [19]

Yamada et al.

[11] Patent Number: 5,176,959
[45] Date of Patent: Jan. 5, 1993

[54] CROSSLINKED POLYMER MICROPARTICLES THEIR PREPARATION AND USE

[75] Inventors: Mitsuo Yamada, Suita; Ryuzo Mizuguchi, Yawata, both of Japan

[73] Assignee: Nippon Paint Company Limited, Osaka, Japan

[21] Appl. No.: 660,811

[22] Filed: Feb. 26, 1991

[30] Foreign Application Priority Data

Feb. 27, 1990 [JP] Japan .................................. 2-49018

[51] Int. Cl.$^5$ .............................................. B32B 5/16
[52] U.S. Cl. .................................. 428/403; 428/407; 428/520; 428/522; 524/923; 528/291; 528/335
[58] Field of Search ...................... 428/402.2, 403, 407, 428/463, 520, 522; 523/418; 524/284, 556, 602, 923; 525/108, 155, 157; 528/291, 112, 342, 335

[56] References Cited

U.S. PATENT DOCUMENTS

| | | | |
|---|---|---|---|
| 4,176,221 | 7/1978 | Shimp | 528/113 |
| 4,461,870 | 7/1984 | Kanda et al. | 525/123 |
| 4,468,493 | 8/1984 | Ishikura et al. | 525/123 |
| 4,477,536 | 10/1984 | Wright et al. | 428/522 |
| 4,530,946 | 7/1985 | Kanda et al. | 523/418 |
| 4,777,199 | 10/1988 | Ishii et al. | 524/284 |
| 4,777,213 | 10/1988 | Kanda et al. | 525/114 |

Primary Examiner—Paul J. Thibodeau
Assistant Examiner—Hoa T. Le
Attorney, Agent, or Firm—Millen, White, Zelano and Branigan

[57] ABSTRACT

Crosslinked polymer microparticles are produced by emulsion polymerizing a monomer mixture containing a crosslinking monomer having a plurality of polymerizable sites in the molecule in an aqueous medium containing a polymeric amide-acid and a neutralizing base as an emulsifier/dispersant. The polymer microparticles are incorporated to thermosetting coating compositions for rheology control and other purposes. The amide-acid moieties of the emulsifier/diapersant are capable upon curing of the coating composition of cyclizing into an imide ring and the polymer amide-acid retained on the polymer microparticles, which imide moieties do not adversely affect the properties of cured films of the coating composition.

16 Claims, No Drawings

CROSSLINKED POLYMER MICROPARTICLES THEIR PREPARATION AND USE

BACKGROUND OF THE INVENTION

Crosslinked polymer microparticles otherwise known as polymer microgels have been used in the coating industry to produce high solids coating compositions and/or to improve the rheological and other properties of water-based and solvent type coating compositions.

The polymer microgels may be produced by the emulsion polymerization of a monomer mixture containing a polyfunctional monomer having at least two ethylenic unsaturation in the molecule. The resulting synthetic latex may be incorporated into a water-base paint as such. For use in solvent type paints, the microgels in the emulsion may be isolated as discrete particles by spray drying, lyophilization or similar processes, or they may be directly dispersed in conventional organic solvents by solvent substitution. When used in a coating composition, the polymer microgels produced by the emulsion polymerization method tend to adversely affect the durability, particularly the water resistance of the resulting coating films owing to the hydrophilic nature of the emulsifier used in the polymerization.

U.S. Pat. No. 4,477,536 to Howard J. Wright et al. discloses the use of polymer microparticles having polar and/or ionic groups such as carboxyl group on their surfaces in two coat-one bake coating systems. The polymer microparticles are produced by the emulsion polymerization method and the carboxyl groups which induce the electrostatic stabilization in the aqueous medium may be introduced, for example, by using as an emulsifier an unsaturated, water-soluble polyester copolymerizable with the monomers constituting the polymer microgels. Alternatively, polymer microparticles having carboxyl groups on their surfaces may be produced by emulsion polymerizing an acrylic or methacrylic acid-containing monomer mixture. In either case, the emulsifier or monomer having polar groups are localized on the particle surface while leaving the nonpolar components in the particle core. The polymer microparticles having polar and/or ionic groups thus produced are also disadvantageous in that they adversely affect the water-resistance of the coating films when incorporated therein.

SUMMARY OF THE INVENTION

It is, therefore, a principal object of the present invention to provide crosslinked polymer microparticles having carboxyl functions on their surfaces which are capable of irreversibly diminishing when a coating composition containing the polymer microparticles is applied on a substrate and baked at an elevated temperature. Thus, the carboxyl groups on the surfaces which serve to impart the polymer particle with an excellent dispersibility into a liquid medium may be diminished in the baked films after performing their functions so as to eliminate their adverse effect on the water resistance and other properties of the cured films.

According to the present invention, the above and other objects may be accomplished by providing crosslinked polymer microparticles having a mean particle size from about 0.01 to 10 microns produced by emulsion polymerizing ethylenically unsaturated monomers, at least a portion of which contains two or more ethylenic unsaturation in the molecule, the polymer microparticles having on their surfaces a layer of a polymer amide-acid of the formula:

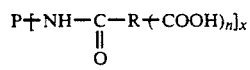

wherein P is a hydrophobic polymer backbone; R is the residue of an aliphatic, alicylic or aromatic di -or tricarboxylic acid having two carboxyl groups attached to the same carbon atom or two adjacent carbon atoms; n is 1 or 2; and x is a positive integer.

In another aspect, the present invention provides a method for producing the crosslinked polymer microparticles of the present invention which comprises emulsion polymerizing ethylenically unsaturated monomers, at least a portion of which contains two or more ethylenic unsaturation in the molecule, in an aqueous medium containing the above polymer amide-acid and a neutralizing amount of a base.

In a further aspect, the present invention provides a coating composition comprising a filmforming polymer, a crosslinker thereof, and the crosslinked polymer microparticles of the present invention, said film-forming polymer and said crosslinker forming a solution or dispersion in a liquid medium, said polymer microparticles being stably dispersed in said solution or dispersion.

DETAILED DESCRIPTION

Monomeric Composition

It is known that crosslinked polymer microparticles may be produced by emulsion polymerizing ethylenically unsaturated monomers, at least a portion of which contains two or more polymerization sites per molecule. The polymer microparticles of the present invention are produced by the known method except for the use as an emulsifier/dispersant the amide-acid oligomer which will be fully discussed hereinafter.

Monomer compositions constituting the polymer microparticles of this invention should contain at least 10% by weight of the composition of at least one polyfunctional monomer having a plurality of ethylenic unsaturation in the molecule and 0 to 90% of at least one monofunctional ethylenically unsaturated monomer.

Monomers having at least two polymerization sites per molecule may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Examples of monomers having one polymerization site includes:

(1) carboxyl bearing monomers as, for example, acrylic acid, methacrylic acid, crotonic acid, itaconic acid, maleic acid and fumaric acid, (2) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol, (3) nitrogen containing alkyl acrylates or methacrylates as, for example, dimethylaminoethyl acrylate, and dimethylaminoethyl methacrylate, (4) polymerizable amides as, for example, acrylic amide and methacrylic amide, (5) polymerizable nitriles as, for example, acrylonitrile and methacrylonitrile, (6) alkyl acrylates or methacrylates as, for example, methyl acrylate, methyl methacrylate, ethyl acrylate, n-butylacrylate, n-butyl methacrylate, and 2-ethylhexylacrylate, (7) polymerizable glycidyl compound as, for example, glycidyl (meth)acrylate, (8) polymerizable aromatic compounds as, for example, styrene, α-methyl styrene, vinyl toluene and t-butylstyrene, (9) α-olefins as, for example, ethylene and propylene,

(10) vinyl compounds as, for example, vinyl acetate and vinyl propionate, and

(11) diene compounds, as, for example, butadiene and isoprene.

The above monomers (1) to (11) may be used in combination. For example, the carboxyl bearing monomers (1) may be used in combination with the polymerizable glycidyl compounds (7) although the carboxyl bearing monomers alone are not preferred. The combination of monomers of these two classes will react to block the carboxyl function.

Amide-Acid Polymer

The amide-acid polymer used as an emulsifier/dispersant in the emulsion polymerization of the present invention has the formula:

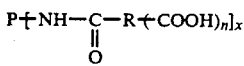

wherein P is a hydrophobic polymer backbone; R is the residue of an aliphatic, alicyclic or aromatic di- or tricarboxylic acid having two carboxyl groups attached to the same carbon atom or two adjacent carbon atoms; n is 1 or 2; and x is a positive integer. The amide-acid group of this polymer is cyclized into an imide ring upon heating according to the following scheme:

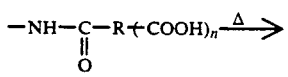

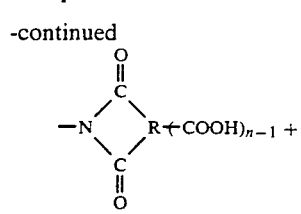

However, the amide-acid polymer prior to the cyclization functions as a surfactant in which the polymer backbone is a hydrophobic block and the amide-acid group is a hydrophilic block. Accordingly, the amide-acid polymer may be used as an emulsifier/dispersant in the emulsion polymerization of ethylenically unsaturated monomers after neutralizing with a suitable base. A variety of such amide-acid oligomers or polymers are disclosed in U.S. patent application Ser. No. 614,485, filed Nov. 16, 1990 and assigned to the assignee of this application, the entire disclosure of which is incorporated herein by reference.

Briefly, primary amino groups possessed by a base polymer at its terminals and/or pendants may be converted into an amide-acid group by reacting with a di- or tricarboxylic acid anhydride.

In case where the base polymer is an amino group-containing resin such as aminoplast resins, polyamide resins, amino group-containing polyurethane resins, polyethyleneimine resins, polyether polyamine resins produced by the amination of polyether polyols, amino group-containing polybutadiene resins or amino group-containing silicones, the base polymer may be directly reacted with the di- or tricarboxylic acid anhydride.

Oxirane ring-containing polymers may be modified so as to have an amino function by the reaction with a diamine according to the following reaction scheme:

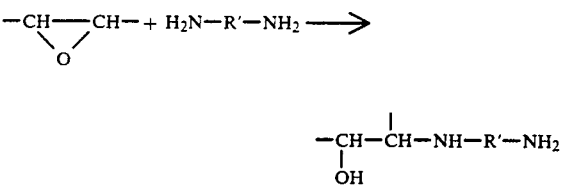

The amine-modified polymers thus produced may be reacted with a di- or tricaboxylic acid anhydride to produce the amide-acid oligomer.

Examples of oxirane ring-containing polymers include epoxy resins, glycidyl group-containing acrylic resins, epoxidized polybutadiene resins and glycidyl group-containing fluororesins.

A wide variety of diamines may be used to open the oxirane ring and introduce an amine function to the oxirane ring-containing polymers. Examples thereof include aliphatic diamines such as diethylenetriamine, trimethylenetetramine, tetraethylenepentamine, polymethylenediamines and polyether diamines; alicyclic diamines such as N,N'-diaminoethylpiperazine, isophorone diamine, 1,3-diaminocyclohexane, 3,9-bis (3-aminopropyl)spiro [5.5] undecane, LAROMINE C-260 sold by BASF, WANDAMINE sold Shin Nippon Rika Co., Ltd., and 1,3-BAC sold by Mitsubishi Gas Chemical Company, Inc.; aromatic diamines such as o-, m- or p-phenylenediamine, 2,4-diaminoanisole, 2,4-tolylenediamine, xylylenediamine, 4,4'-bis(4-aminophenoxy) biphenyl, 4,4'-diaminodiphenylsulfone, 3,3'- diaminodiphenylsulfone, bis [4-(4-aminophenoxy)phenyl] sulfone, bis [4-(3-aminophenoxy)phenyl] sulfone, bis [4-(2-aminophenoxy) phenyl] sulfone, 1,4-bis (4-aminophenoxy) benzene, 1,3-bis (4-aminophenoxy) benzene, 1,3-bis (3-aminophenoxy) benzene, bis [4-(4-aminophenoxy)phenyl] ether, bis (3-ethyl-4-aminophenyl)methane, bis (3-chloro-4-aminophenyl)methane, 4,4'-diaminodiphenylsulfide, 3,3'-diaminodiphenyl ether, 3,4'-diaminodiphenyl ether, 4,4'-diaminodiphenyl ether, 4,4'-diaminodiphenylmethane, 2,2-bis [4-(4-aminophenoxy)phenyl] propane, 2,2-bis [4-(4-aminophenoxy)phenyl] hexafluoropropane, 2,2-bis (3-hydroxy-4-aminophenyl) propane, 2,2-bis (3-hydroxy-4-aminophenyl) hexafluoropropane and o-toluidinesulfone. A small amount of polyamines such as 3,3',4,4'-tetraaminobiphenyl and 3,3'4,4'-tetraaminodiphenyl ether may be used in conjunction with diamines.

In order to prevent two amino groups from reacting with an oxirane ring simultaneously, one of amino groups of diamines may be blocked with a ketone to form a ketimine and then unblocked after opening the oxirane ring with the other amino group.

The amino group-containing polymers and the amine-modified oxirane ring-containing polymers described above may be amidated with a di- or tricarboxylic acid anhydride according to the following reaction scheme:

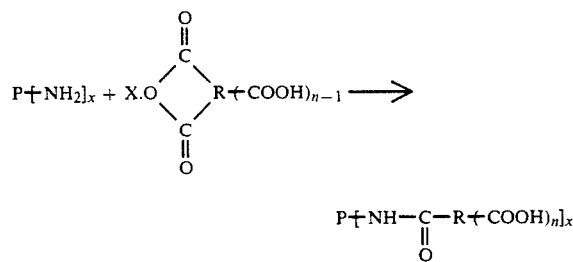

wherein all symbols are as defined above.

The acid anhydrides used for this purpose are those derived from di- or tricarboxylic acids in which at least two carboxyl groups are attached to the same and single carbon atom or to two adjacent carbon atoms so that the resulting amide-acid moiety may be cyclized into a four- or five-membered imide ring.

Examples of suitable di- and tricarboxylic acid anhydrides include succinic anhydride, dodecenylsuccinic anhydride, maleic anhydride, phthalic anhydride, tetrahydrophthalic anhydride, methyltetrahydrophtalic anhydride, endomethylenetetrahydrophthalic anhydride, methylendomethylenetetrahydrophthalic anhydride, methylbutenyltetrahydrophthalic anhydride, hexahydrophthalic anhydride, methylhexahydrophthalic anhydride, chloroendic anhydride, tetrabromophthalic anhydride, tetrachlorophthalic anhydride and trimellitic anhydride.

The molar ratio of the acid anhydride to the amino group-containing polymer and the molar ratios of the diamine and acid anhydride, respectively, to the oxirane ring-containing polymer are preferably adjusted so that the acid number of the resulting polymer amide-acid is 20 to 200. The number average molecular weight of the polymer amide-acid preferably ranges from 500 to 10,000.

Emulsion Polymerization

Using the above-described polymer amide-acid as an emulsifier, the crosslinked polymer microparticles of the present invention may be prepared from the above-described monomer composition by the conventional emulsion polymerization method in an aqueous medium containing the emulsifier, a neutralizing amount of a base and a water-soluble initiator.

Examples of useable initiators include organic peroxides such as benzoyl peroxide, t-butylperoxide or cumene hydroperoxide; azo initiators such as azobiscyanovaleric acid, azobisisobutyronitrile, azobis(2,4-dimethylvaleronitrile) or azobis(2-amidinopropane) hydrochloride; inorganic initiators such as potassium persulfate, sodium persulfate, ammonium persulfate or hydrogen peroxide; and redox initiators containing a combination of the above inorganic initiators with sodium pyrosulfite, sodium hydrogen sulfite or ferrous ions.

The aqueous medium is usually water but may contain a small amount of a water-miscible organic solvent such as methanol, ethanol, methylcellosolve or ethylcellosolve.

The initiator may be used in an amount of 0.05 to 5% based on the weight of the monomer composition.

The polymer amide-acid functioning as an emulsifier may be used in an amount from 0.1 to 50 parts by weight per 100 parts by weight of the monomer composition. The polymer amide-acid is localized during the emulsion polymerization at the interfaces between the dispersed phase and the aqueous continuous phase owing to its hydrophilic amide-acid groups to form a surface layer of the polymer microparticles. Therefore, if the amount thereof is too small, the resulting emulsion will tend to become unstable because of the agglomeration into larger secondary particles. Conversely, excessive amounts also decrease the stability of the emulsion.

The average particle size of the polymer microparticles may be controlled by selecting suitable conditions and ranges generally between 0.01 and 10 microns.

After the polymerization, the aqueous emulsion may be formulated as such in water-based coating compositions or converted into an anhydrous form by solvent substitution, azeotropic distillation, centrifugation, filtration or drying for use in the formulation of solvent-type coating compositions.

Coating Composition

The crosslinked polymer microparticles of the present invention may be formulated into a variety of thermosetting coating compositions for rheology control purposes and/or for making high solid compositions. Such coating compositions comprise generally a solution or dispersion of a film-forming resin and a crosslinker thereof in a volatile liquid medium, and an amount of the crosslinked polymer microparticles uniformly dispersed in said solution or dispersion. The proportion of the polymer microparticles in the coating composition may vary with their intended purposes and generally amounts from 1% to 50% by weight of the total solids content of the film-forming resin and the crosslinker.

A wide variety of combinations of crosslinkable film-forming resins and crosslinkers are known in the coating industry. For example, hydroxy group-containing acrylic, polyester or alkyd resins may be crosslinked with aminoplast resins such as melamineformaldehyde condensate or its etherified products with methanol or butanol. One of important advantages derived from the use of the polymer microparticles of this invention in this type of coating system is that it eliminates or decreases the amount of an acid catalyst required for accelerating the crosslinking reaction between the hydroxy group-containing resin and the melamine resin. Conventional formulations containing melamine resins generally utilize an acid such as p-toluenesulfonic acid or phosphate esters as a catalyst. The polymer amide-acid carried by the polymer microparticles of this invention functions as a catalyst in the crosslinking reaction, but its acid function becomes lost by cyclizing into an imide ring after catalyzing the crosslinking reaction. Accordingly, the polymer amide-acid will not adversely affect the durability of cured films as do the acid catalysts used in conventional systems.

Active hydrogen atom-containing resins such as hydroxy group-containing acrylic, polyester or alkyd resins may be cured with blocked polyisocyanate compounds. The crosslinked polymer microparticles of this invention may also be formulated in this type of coating systems. In this case the polymer amide-acid carried by the polymer microparticles functions as a negative catalyst for the reaction between the resin and the blocked polyisocyanate at the ambient temperature to promote the storage stability of the coating composition. However, the acid function disappears by cyclizing into an imide ring at an elevated temperature at which the crosslinking reaction proceeds as desired.

As stated before, the combination of film-forming resins and crosslinkers thereof, liquid diluents thereof, pigments and other conventional additives are all well-known in the art. Accordingly, it is believed that those skilled in the art may formulate a wide variety of particular compositions depending upon specific purposes and usages within the teachings of the present invention.

The invention is illustrated by the following examples in which all parts and percents therein are by weight unless otherwise specified.

EXAMPLE 1

A reactor equipped with a stirrer, a reflux condenser and a nitrogen gas-introducing tube was charged with 100 g of polyoxytetramethylenediamine having a molecular weight of 1100 and an amine equivalent of $1.6 \times 10^{-3}$ eq./g (Hodogaya Chemical Co., Ltd.) and 30 g of dioxane. 16 g of maleic anhydride was added portionwise to the reactor under the nitrogen gas atomosphere and allowed to react at 30° C. for 2 hours with stirring. The reaction mixture was evaporated to remove the solvent to give an amide-acid resin having an acid number of 79 and a molecular weight of 1300. IR spectrum analysis revealed the presence of amide moiety at 1660 cm$^{-1}$.

EXAMPLE 2

To a reactor equipped with a stirrer, a reflux condenser and a nitrogen gas-introducing tube were added 100 g of dimethylpolysiloxanediamine (X-22-161 A sold by Shin-Etsu Chemical Co., Ltd., M.W.=1700, amine equivalent=1.0 meq./g). Then 17 g of phthalic anhydride was added portionwise to the reactor under nitrogen gas atmosphere and allowed to react at 30° C. for 3 hours with stirring. An amide-acid resin having an acid number of 56 and a molecular weight (GPC) of 2,000 was obtained. IR spectrum analysis revealed the presence of amide moiety at 1660 cm$^{-1}$.

EXAMPLE 3

To a reactor equipped with a stirrer, a reflux condenser and a nitrogen gas-introducing tube were added 100 g of bisphenol A diglycidyl ether having an epoxy equivalent of 950 and 100 g of dioxane. 21 g 4,4'-diaminodiphenylmethane was added to the reactor and allowed to react at 80° C. To this was added 16 g of hexahydrophthalic anhydride portionwise under the nitrogen gas atmosphere and allowed to react at 30° C. for 5 hours. The reaction mixture was evaporated to remove the solvent to give an amide-acid resin having an acid number of 87 and a molecular weight (GPC) of 2600. IR spectrum analysis revealed the presence of amide moiety at 1660 cm$^{-1}$.

EXAMPLE 4

To a reactor equipped with a stirrer, a reflux condenser and a nitrogen gas-introducing tube were charged 105 g of polyoxypropylenediamine (JEFFAMINE D-200 sold by Texaco), 205 g of dimethylpolysiloxanediamine (X-22-161 C sold by Shin-Etsu Chemical Co., Ltd., M.W.=3,900) and 100 g of bisphenol A diglycidyl ether having an epoxy equivalent of 950. After the reaction at 80° C., the mixture was diluted with 200 g of dioxane and 20 g of trimellitic anhydride was added portionwise at 5° C. under the nitrogen gas atmosphere. The reaction was continued for additional 8 hours at room temperature with stirring to give an amide-acid resin having an acid number of 26 and a molecular weight (GPC) of 8200 after removing the solvent. IR spectrum analysis revealed the presence of amide moiety at 1660 cm$^{-1}$.

EXAMPLE 5

A reactor equipped with a stirrer, a reflux condenser and a nitrogen gas introducing tube were charged with 100 g of polyoxytetramethylenediamine having a molecular weight of 1100 and an amine equivalent of $1.6 \times 10^{-3}$ eq./g (Hodogaya Chemical Co., Ltd.) and 30 g of dioxane. Then 38 g trimellitic anhydride was added portionwise to the reactor at 30° C. under the nitrogen gas atmosphere and allowed to react 2 hours with stirring. The reaction mixture was evaporated to remove the solvent to give an amide-acid resin having an acid number of 150 and a molecular weight (GPC) of 1500. IR spectrum analysis revealed the presence of amide moiety at 1660 cm$^{-1}$.

EXAMPLE 6 (For Comparison)

A reactor equipped with a stirrer, a reflux condenser and a nitrogen gas-introducing tube were charged with 100 g of bisphenol A diglycidyl ether having an epoxy equivalent of 450, 1 g of benzyldimethylamine, 30 g of dioxane and 15 g of maleic acid. The mixture was allowed to react at 120° C. with stirring until no epoxide group was detected. The mixture was evaporated to remove the solvent whereupon an epoxy acid maleate resin having an acid number of 100 and a molecular weight (GPC) of 1300 was obtained. IR spectrum analysis revealed the presence of ester linkage at 1720 cm$^{-1}$.

EXAMPLE 7

To a reactor equipped with a stirrer, a reflux condenser and a nitrogen gas-introducing tube were charged 130 parts of deionized water, 15 parts the dispersant produced in Example 1 and 2 parts of dimethylethanolamine. The mixture was stirred at 80° C. to make a solution. To the solution were added dropwise a monomer mixture consisting of 40 parts of styrene, 40 parts of ethylene glycol dimethacrylate (EGDM), 10 parts of n-butyl acrylate and 10 parts of methyl methacrylate, and an initiator solution containing 1 part of azobiscyanovaleric acid (ACVA) and 0.7 parts of dimethylethanolamine in 20 parts of deionized water with stirring over 60 minutes. Stirring was continued for additional 90 minutes whereupon a dispersion of crosslinked polymer microparticles having a nonvolatile content of 40% and a mean particle size measured by the laser scattering method of 102 mμ was obtained.

EXAMPLE 8

To a reactor equipped with a stirrer, a reflux condenser and a nitrogen gas introducing tube were charged 130 parts of deionized water, 15 parts of the dispersant produced in Example 2 and 1.4 parts of dimethylethanolamine. The mixture was stirred at 80° C. to make a solution.

To the solution were added dropwise a monomer mixture consisting of 40 parts of styrene, 40 parts of EGDM, 10 parts of n-butyl acrylate and 10 parts of methyl methacrylate, and an initiator solution of 1 part of ACVA and 0.7 parts of dimethylethanolamine in 20 parts of deionized water with stirring over a period of 60 minutes. Stirring was continued for an additional 90 minutes, whereupon a dispersion of crosslinked polymer microparticles having a nonvolatile content of 40% and a mean particle size measured by the laser scattering method of 230 mμ was obtained.

EXAMPLES 9–14

The process of Example 7 was followed using monomeric compositions and dispersants as shown in Table 1.

EXAMPLES 15 and 16

The process of Example 7 was followed with the proportion of monomers being varied as shown in Table 1.

COMPARATIVE EXAMPLE 1

The process of Example 7 was followed using the epoxy acid maleate resin produced in Example 6 as a dispersant.

COMPARATIVE EXAMPLES 2 and 3

The process of Example 7 was followed using sodium dodecyl sulfate (SDS) and sodium stearate, respectively, as a dispersant.

TABLE 1

| | \multicolumn{10}{c}{Example No.} | | | | | | | | | |
|---|---|---|---|---|---|---|---|---|---|---|
| | 7 | 8 | 9 | 10 | 11 | 12 | 13 | Comp. 1 | Comp. 2 | Comp. 3 |
| Dispersant | Ex. 1 | Ex. 2 | Ex. 3 | Ex. 4 | Ex. 5 | Ex. 1 | Ex. 1 | Ex. 6 | SDS | Na stearate |
| Parts | 15 | 15 | 15 | 50 | 2 | 15 | 15 | 15 | 2 | 2 |
| Recipe (parts) | | | | | | | | | | |
| Deionized water | 150 | 150 | 150 | 225 | 150 | 150 | 150 | 150 | 150 | 150 |
| Styrene | 40 | 40 | 40 | 40 | 40 | 40 | 20 | 40 | 40 | 40 |
| n-Butyl acrylate | 10 | 10 | 10 | 10 | 10 | 45 | 10 | 10 | 10 | 10 |
| Methyl methacrylate | 10 | 10 | 10 | 10 | 10 | 10 | 10 | 10 | 10 | 10 |
| EGDM | 40 | 40 | 40 | 40 | 40 | 40 | 40 | 40 | 40 | 40 |
| ACVA | 1 | 1 | 1 | 1 | 1 | 1 | 1 | 1 | 1 | 1 |
| Nonvolatile (%) | 42 | 40 | 41 | 38 | 39 | 40 | 40 | 42 | 40 | 40 |
| Agglomerates | None | None | None | Few | None | None | None | None | None | None |
| Mean diameter (μm) | 102 | 230 | 90 | 455 | 130 | 86 | 110 | 100 | 90 | 170 |
| Decrease in acid* function (%) | 82 | 92 | 90 | 48 | 40 | 82 | 82 | 2 | 0 | 0 |

Note:
Decrease in acid function was determined based on the initial acid number titrated with 1N ethanolic KOH in DMF and the corresponding acid number after heating at 160° C. for 20 minutes.

Note: Decrease in acid function was determined based on the initial acid number titrated with 1N ethanolic KOH in DMF and the corresponding acid number after heating at 160° C. for 20 minutes.

EXAMPLE 14

17 parts of a water-soluble acrylic resin having a number average molecular weight of 6000, an acid number of 80, a hydroxy number of 70 and a solids content of 30%, 50 parts of titanium dioxide pigment (TIPAKE R-930 sold by Ishihara Sangyo Kaisha, Ltd.), 10 parts of melamine resin (CYMEL 303 sold Mitsui Toatsu Chemicals, Inc.) were thoroughly dispersed in 10 parts of butylcellosolve and 13 parts of deionized water for one hour using a red devil. After dispersing the pigment to a particle size less than 10 μ, a pigment paste was obtained.

100 parts of this pigment paste were transferred to a table disper and 100 parts of a water-soluble acrylic resin having a number average molecular weight of 8000, an acid number of 60, a hydroxy number of 80 and a solids content of 25% as well as 15 parts of the polymer microparticle dispersion of Example 7 were mixed thereto.

EXAMPLES 15–20

The process of Example 14 was followed except that the polymer microparticle dispersion of Examples 8–13, respectively, were used.

COMPARATIVE EXAMPLES 4–6

The process of Example 14 was followed except that the polymer microparticle dispersion of Comparative Example 1–3, respectively, were used.

Water-based coating compositions of Examples 14–20 and comparative Examples 4–6 were evaluated for their film properties. Each composition was diluted with deionized water to a Ford cup #4 viscosity at 30 seconds, sprayed on a steel plate, allowed to set for 5 minutes and baked at 160° C. for 20 minutes. The results obtained are shown in Table 2.

TABLE 2

| | Example No. | | | | | | | Comp. 4 | Comp. 5 | Comp. 6 |
|---|---|---|---|---|---|---|---|---|---|---|
| | 14 | 15 | 16 | 17 | 18 | 19 | 20 | | | |
| Polymer microparticle dispersion | Ex. 7 | Ex. 8 | Ex. 9 | Ex. 10 | Ex. 11 | Ex. 12 | Ex. 13 | Comp. Ex. 1 | Comp. Ex. 2 | Comp. Ex. 3 |
| Parts | 15 | 15 | 15 | 15 | 15 | 15 | 15 | 15 | 15 | 15 |
| Pigment paste (parts) | 100 | 100 | 100 | 100 | 100 | 100 | 100 | 100 | 100 | 100 |
| Water-soluble acrylic resin (parts) | 100 | 100 | 100 | 100 | 100 | 100 | 100 | 100 | 100 | 100 |
| Workability[1] | Good | Good | Good | Good | Good | Good | Good | Good | Good | Good |
| Water resistance[2] | Good | Good | Good | Good | Good | Good | Good | Not Good | Not Good | Not Good |

Note 1): Workability was evaluated as Not Good if the coating composition caused sagging when applied to a maximum film thickness of 40μ. Note 2): Water resistance was evaluated as Not Good if the film became dull after soaking in a water bath at 40° C. for 120 hours.

EXAMPLE 21

A clear coat composition was prepared by mixing 100 parts of a solvent type acrylic resin having a number average molecular weight of 7000, an acid number of 10, a hydroxy number of 70 and a solids content of 70%, and 50 parts of a blocked polyisocyanate crosslinker (trimethylolpropane: 4.4'-diphenylmethane-diisocyanate: ethylene glycol monobutyl ether = 1:3:3 on molar basis, solids content = 60%).

To the composition were added 1.5 parts of dibutyltin oxide and 50 parts of the polymer microparticles produced in Example 7 dispersed in methyl isobutyl ketone by solvent substitution to a solids content of 40%.

EXAMPLE 22

The process of Example 21 was followed except that 30 parts of melamine resin (CYMEL 303 sold by Mitsui Toatsu Chemicals, Inc.) were used as crosslinker.

COMPARATIVE EXAMPLE 7

The process of Example 21 was followed except that the polymer microparticles of Comparative Example 2 solvent-substituted with methyl isobutyl ketone was used.

COMPARATIVE EXAMPLE 8

The process of Example 22 was followed except that 2 parts of p-toluenesulfonic acid were added instead of polymer microparticles.

The coating composition of Examples 21 and 22 and Comparative Examples 7 and 8 were evaluated for their film properties. Each composition was sprayed onto a steel plate to a dry film thickness of 30μ and baked at 140° C. for 20 minutes. The results obtained are shown in Table 3 below.

TABLE 3

| | Example No. | | | |
|---|---|---|---|---|
| | 21 | 22 | Comp. 7 | Comp. 8 |
| Polymer microparticles | Ex. 7 | Ex. 7 | Comp. Ex. 2 | Not added |
| Parts | 50 | 50 | 50 | |
| Acrylic resin | 100 | 100 | 100 | 100 |
| Blocked polyisoisocyanate | 50 | — | 50 | — |
| Melamine resin | — | 30 | — | 30 |
| Dibutyltin oxide | 1.5 | — | 1.5 | — |
| p-Toluenesulfonic acid | — | — | — | 2.0 |
| MIBK rubbing test[3] | No change | No change | Slightly dull | Slightly dull |
| Water resistance[4] | Good | Good | Not good | Not good |

Note 3): The film was rubbed with an MIBK-impregnated fabric at 50 reciprocations and then visually observed its appearance. Note 4): Water resistance was evaluated as Not Good if the film became dull after soaking in a water bath at 40° C. for 120 hours.

What is claimed is:

1. Crosslinked polymer microparticles having a mean particle size from about 0.01 to 10 microns produced by emulsion polymerizing ethylenically unsaturated monomers, at least 10 wt. % of which contains two or more sites of ethylenic unsaturation in the molecule, which polymer microparticles have on their surfaces a layer of a polymer amide-acid of the formula:

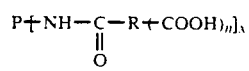

wherein P is a hydrophobic polymeric backbone; R is the residue of an aliphatic, alicyclic or aromatic di- or tricarboxylic acid having two carboxyl groups attached to the same carbon atom or two adjacent carbon atoms; n is 1 or 2; and x is a positive integer.

2. The crosslinked polymer microparticles as claimed in claim 1, wherein said polymer amide-acid has an acid number from 20 to 200 and a number average molecular weight from 500 to 10,000.

3. The crosslinked polymer microparticles as claimed in claim 1, wherein said polymer amide-acid is produced by reacting an amino group-containing polymer with the anhydride of said di- or tricarboxylic acid.

4. The crosslinked polymer microparticles as claimed in claim 1, wherein said polymer amide-acid is produced by the steps of reacting an oxirane ring-containing polymer with a diamine to open the oxirane ring and then reacting the resulting diamine-modified polymer with the anhydride of said di- or tricarboxylic acid.

5. A method for producing crosslinked polymer microparticles having a mean particle size from about 0.01 to 10 microns comprising emulsion polymerizing ethylenically unsaturated monomers, at least 10 wt. % of which contains two or more sites of ethylenic unsaturation in the molecule, in an aqueous medium containing as an emulsifier/dispersant a polymer amide-acid of the formula:

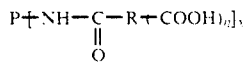

wherein P is a hydrophobic polymeric backbone; R is the residue of an aliphatic, alicyclic or aromatic di- or tricarboxylic acid having two carboxyl groups attached to the same carbon atom or two adjacent carbon atoms; n is 1 or 2; and x is a positive integer; and an amount of base effective to neutralize said polymer amide-acid.

6. The method as claimed in claim 5, wherein said polymer amide-acid has an acid number from 20 to 200 and a number average molecular weight from 500 to 10,000.

7. The method as claimed in claim 5, wherein said polymer amide-acid is produced by reacting an amino group-containing polymer with the anhydride of said di- or tricarboxylic acid.

8. The method as claimed in claim 5, wherein said polymer amide-acid is produced by the steps of reacting an oxirane ring-containing polymer with a diamine to open the oxirane ring and then reacting the resulting diamine-modified polymer with the anhydride of said di- or tricarboxylic acid.

9. A thermosetting coating composition comprising a film-forming polymer, a crosslinker thereof, a liquid medium for dissolving or dispersing said film-forming polymer and said crosslinker, and the crosslinked polymer microparticles of claim 1 uniformly dispersed in the solution or dispersion of said film-forming polymer and said crosslinker.

10. The coating composition as claimed in claim 9, wherein said film-forming polymer is a hydroxy group-containing polymer and said crosslinker is a melamine resin.

11. The coating composition as claimed in claim 9, wherein said film-forming polymer is an active hydrogen atom-containing polymer and said crosslinker is a blocked polyisocyanate compound.

12. The coating composition as claimed in claim 9, wherein said liquid medium is water or a mixture of water with a water-miscible organic solvent.

13. The coating composition as claimed in claim 9, wherein said liquid medium is an organic volatile solvent.

14. The coating composition as claimed in claim 9, wherein said polymer amide-acid of said microparticles has an acid number from 20 to 200 and a number average molecular weight from 500 to 10,000.

15. The coating composition as claimed in claim 9, wherein said polymer amide-acid is produced by reacting an amino group-containing polymer with the anhydride of said di- or tricarboxylic acid.

16. The coating composition as claimed in claim 9, wherein said polymer amide-acid is produced by the steps of reacting an oxirane ring-containing polymer with a diamine to open the oxirane ring and then reacting the resulting diamine-modified polymer with the anhydride of said di- or tricarboxylic acid.

* * * * *